US012643175B2

(12) United States Patent
Song et al.

(10) Patent No.: US 12,643,175 B2
(45) Date of Patent: Jun. 2, 2026

(54) TWO-PHOTON MICROSCOPY AND PULSE WIDTH CORRECTION METHOD USING THE SAME

(71) Applicant: Electronics and Telecommunications Research Institute, Daejeon (KR)

(72) Inventors: Dong Hoon Song, Daejeon (KR); Hong-Seok Seo, Daejeon (KR); Chul Huh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 836 days.

(21) Appl. No.: 17/728,302

(22) Filed: Apr. 25, 2022

(65) Prior Publication Data

US 2022/0395924 A1 Dec. 15, 2022

(30) Foreign Application Priority Data

Jun. 11, 2021 (KR) ........................ 10-2021-0076263
Jan. 19, 2022 (KR) ........................ 10-2022-0008013

(51) Int. Cl.
*B23K 26/0622* (2014.01)
*B23K 26/064* (2014.01)
(Continued)

(52) U.S. Cl.
CPC ...... *B23K 26/0624* (2015.10); *B23K 26/0652* (2013.01); *H01S 3/0057* (2013.01); *G02B 21/0076* (2013.01); *H01S 3/005* (2013.01)

(58) Field of Classification Search
CPC ........... B23K 26/0624; B23K 26/0652; H01S 3/0057; H01S 3/005; G02B 21/0076;
(Continued)

(56) References Cited

U.S. PATENT DOCUMENTS 6,697,196 B2 2/2004 Suzuki
6,855,941 B1 * 2/2005 Tomioka ............ G01N 21/6458
250/483.1
(Continued)

FOREIGN PATENT DOCUMENTS

JP H10318924 A * 12/1998
JP H11119106 A * 4/1999 ............. G01N 21/64
(Continued)

OTHER PUBLICATIONS

G. Steinmeyer, "Brewster-angled chirped mirrors for high-fidelity dispersion compensation and bandwidths exceeding one optical octave," Opt. Express 11, 2385-2396 (2003) (Year: 2003).*
(Continued)

*Primary Examiner* — Tarifur R Chowdhury
*Assistant Examiner* — Kaitlyn E Kidwell
(74) *Attorney, Agent, or Firm* — NSIP Law

(57) ABSTRACT

Provided is a two-photon spectroscopy including a light source configured to generate first laser light having a pulse, a pulse width correction device configured to receive the first laser light to output a second laser light, an optical system through which the second laser light passes, a first two-photon sensor configured to measure a first pulse width of the first laser light generated from the light source, and a second two-photon sensor configured to measure a second pulse width of the second laser light passing through the optical system, wherein the pulse width correction device corrects a difference between the first pulse width and the second pulse width.

20 Claims, 11 Drawing Sheets

(51) Int. Cl.
 *G02B 21/00* (2006.01)
 *H01S 3/00* (2006.01)

(58) Field of Classification Search
 CPC .... G01N 15/075; G01N 1/22; G01N 33/0047;
 G01N 33/0063; G01N 33/0068; G01N
 2015/0046; G01N 33/0009; G01N
 15/1456; G01N 2015/1486; G01N 15/06;
 F04B 45/047; G01D 21/02
 See application file for complete search history.

(56) References Cited

U.S. PATENT DOCUMENTS

| | | | |
|---|---|---|---|
| 9,846,121 B2 | 12/2017 | Schönborn | |
| 10,425,155 B2 | 9/2019 | Kim et al. | |
| 2002/0080477 A1* | 6/2002 | Suzuki | G02B 21/06 |
| | | | 359/368 |
| 2008/0259445 A1* | 10/2008 | Kubo | G02B 21/0076 |
| | | | 359/388 |
| 2010/0224794 A1 | 9/2010 | Yajima et al. | |
| 2010/0232459 A1* | 9/2010 | Hashimoto | G01J 3/10 |
| | | | 372/25 |

| | | | |
|---|---|---|---|
| 2013/0299706 A1 | 11/2013 | Jung et al. | |
| 2015/0214688 A1 | 7/2015 | Song et al. | |
| 2019/0013636 A1* | 1/2019 | Morikazu | H01S 3/0057 |
| 2019/0380585 A1 | 12/2019 | Chen et al. | |

FOREIGN PATENT DOCUMENTS

| | | |
|---|---|---|
| JP | 2002-107635 A | 4/2002 |
| JP | 2010-160264 A | 7/2010 |
| JP | 2020-509402 A | 3/2020 |
| KR | 10-1820652 B1 | 1/2018 |
| KR | 10-2021-0128711 A | 10/2021 |

OTHER PUBLICATIONS

Denk, Winfried et al., "Two-Photon Laser Scanning Fluorescence Microscopy" *Science, New Series*, vol. 248, No. 4951 Apr. 6, 1990 pp. 73-76.
Korean Office Action Issued on May 20, 2025, in Counterpart Korean Patent Application No. 10-2022-0008013 (7 Pages in English, 9 pages in Korean).

* cited by examiner

TWO-PHOTON MICROSCOPY AND PULSE WIDTH CORRECTION METHOD USING THE SAME

CROSS-REFERENCE TO RELATED APPLICATIONS

This U.S. non-provisional patent application claims priority under 35 U.S.C. § 119 of Korean Patent Application Nos. 10-2021-0076263, filed on Jun. 11, 2021, and 10-2022-0008013, filed on Jan. 19, 2022, the entire contents of which are hereby incorporated by reference.

BACKGROUND

The present disclosure herein relates to a two-photon microscopy and a pulse width correction method using the same, and more particularly, to a two-photon microscopy in which pulse width modulation of laser light due to an optical system is minimized, and a pulse width correction method using the same.

Since Denk et al. presents "Two-photon laser scanning fluorescence microscopy" first in 1990, a two-photon microscopy technology has been used in various bio-medical fields. The two-photon microscopy technology is a technology that measures fluorescence by irradiating focal points with two near-infrared photons having low energy to excite electrons in a sample for an instantaneous time (e.g., femtoseconds), and uses a near-infrared femtosecond laser light source having a relatively longer wavelength than a continuous laser light source in a visible light region used in a confocal microscopy. Through this, the limit of depth for a measurement sample in the confocal technology using a single photon may be overcome. In addition, the two-photon microscopy technology is advantageous in that it is free from phototoxicity, photobleaching, or the like that is a flaw of the confocal microscopy.

SUMMARY

The present disclosure provides a two-photon microscopy in which a distortion of laser light due to an optical system is minimized.

The present invention is not limited to the above purpose, and those skilled in the art can understand other purposes from the following descriptions.

An embodiment of the inventive concept provides a two-photon spectroscopy including: a light source configured to generate first laser light having a pulse; a pulse width correction device configured to receive the first laser light to output a second laser light; an optical system through which the second laser light passes; a first two-photon sensor configured to measure a first pulse width of the first laser light generated from the light source; and a second two-photon sensor configured to measure a second pulse width of the second laser light passing through the optical system, wherein the pulse width correction device corrects a difference between the first pulse width and the second pulse width.

In an embodiment of the inventive concept, a two-photon spectroscopy includes: a light source configured to generate first laser light having a pulse; an interference system configured to receive the first laser light to output second and third beams of laser light; a first two-photon sensor configured to measure a first pulse width of the second laser light; a pulse with correction device configured to receive the third laser light to output a fourth laser light; an optical system configured to receive the fourth laser light to output fifth laser light; and a second two-photon sensor configured to measure a second pulse width of the fifth laser light, wherein the pulse width correction device corrects a difference between the first pulse width and the second pulse width.

In an embodiment of the inventive concept, a pulse width correction method includes: measuring a first pulse width of first laser light output from a light source; measuring a second pulse width of second laser light output from the optical system when the first laser light passes through the optical system; calculating a difference between the first pulse width and the second pulse width; and correcting the first pulse width of the first laser light using a negative dispersion value corresponding to the difference between the first and second pulse widths.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept.

FIG. 1 illustrates a two-photon microscopy according to an embodiment of the inventive concept.

FIGS. 2 and 3 illustrate a pulse width correction method of the two-photon microscopy according to embodiments of the inventive concept.

FIG. 7 illustrates an example of an optical system of FIG. 1.

DETAILED DESCRIPTION

The embodiments of the present invention will now be described with reference to the accompanying drawings for sufficiently understating a configuration and effects of the inventive concept. However, the inventive concept is not limited to the following embodiments and may be embodied in different ways, and various modifications may be made thereto. The embodiments are just given to provide complete disclosure of the inventive concept and to provide thorough understanding of the inventive concept to those skilled in the art. In the accompanying drawings, the sizes of the elements may be greater than the actual sizes thereof, for convenience of description, and the scales of the elements may be exaggerated or reduced.

Figure 1:
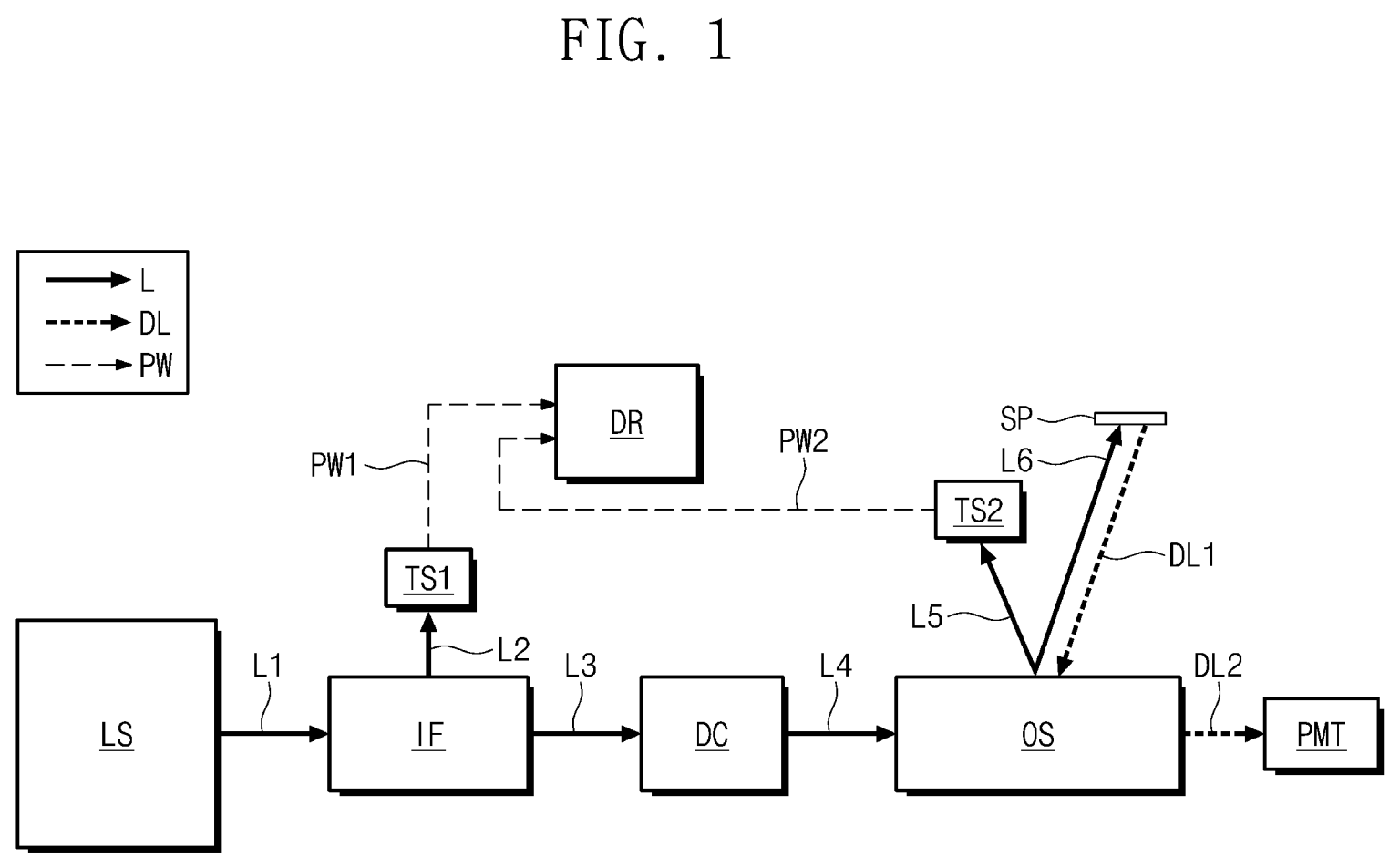
Figure 2:
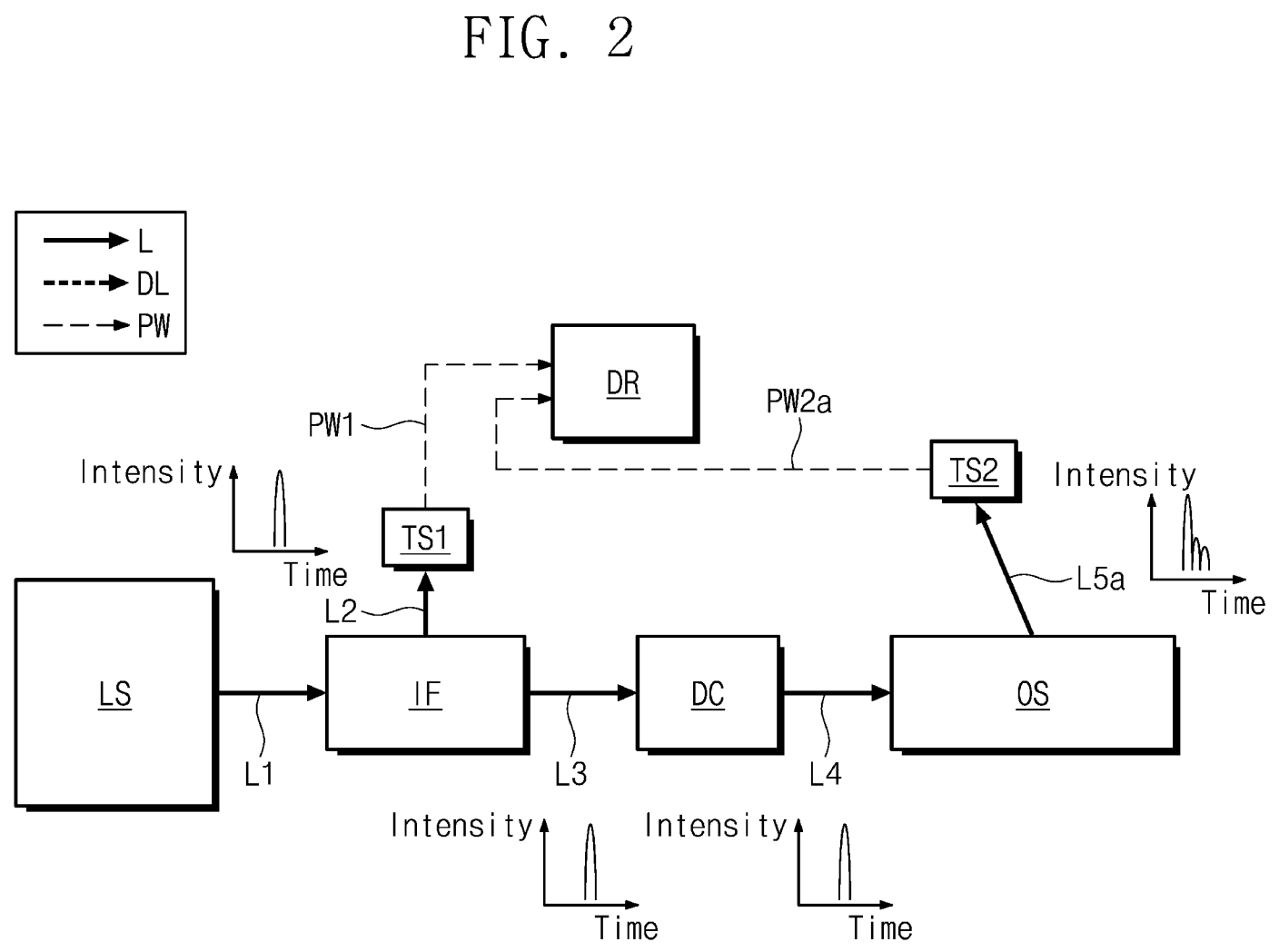
Figure 3:
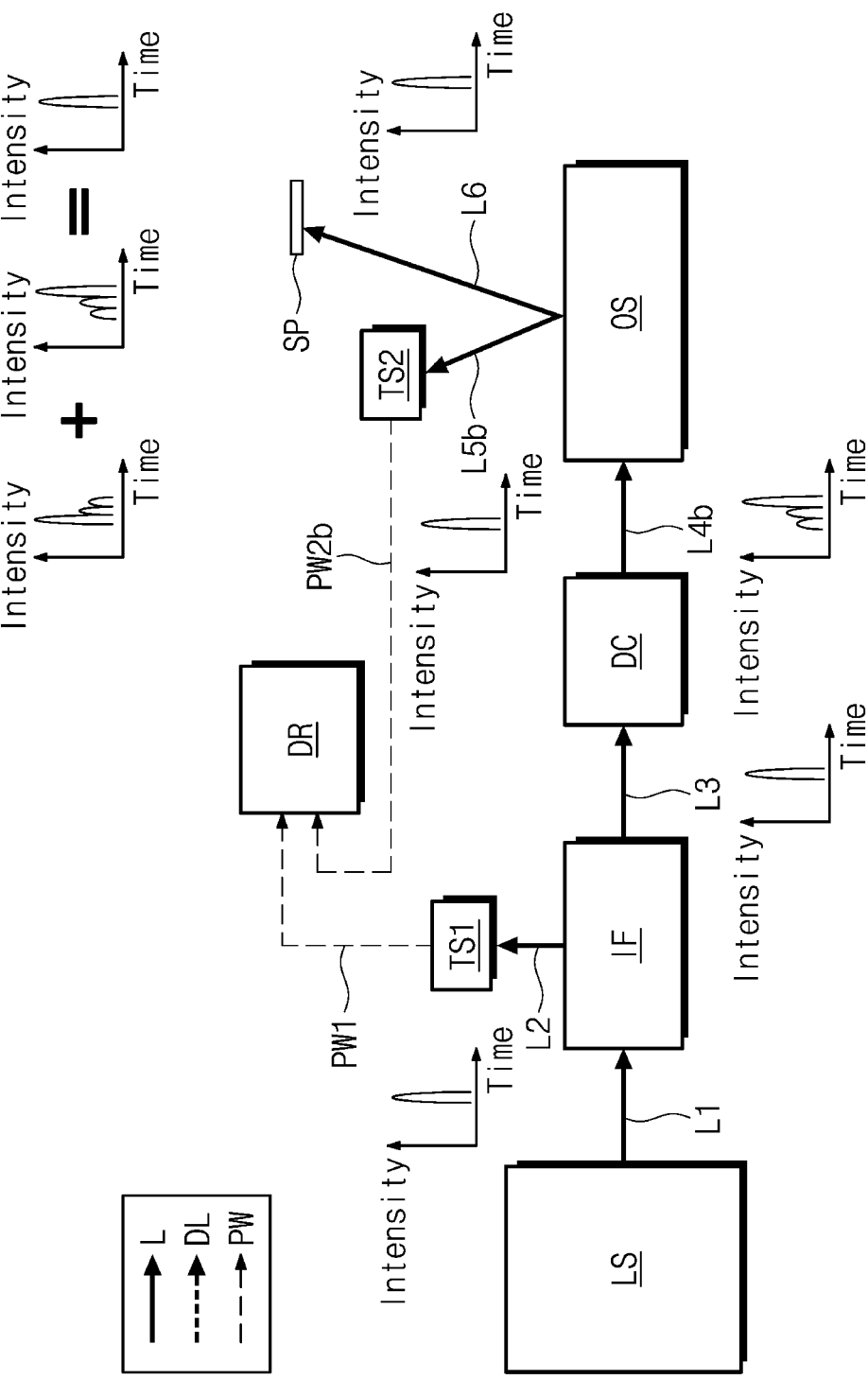

FIG. 1 illustrates a two-photon microscopy according to an embodiment of the inventive concept. FIGS. 2 and 3 illustrate a pulse width correction method of the two-photon microscopy according to embodiments of the inventive concept. Hereinafter, the two-photon microscopy and the pulse width correction method using the same according to the embodiments of the inventive concept will be described.

Referring to FIG. 1, the two-photon microscopy may include a light source LS, an interference system IF, a pulse width correction device DC, an optical system OS, a first two-photon sensor TS1, a second two-photon sensor TS2, a data reception unit DR, a sample part SP, and a detector PMT.

Referring to FIGS. 1 and 2, prior to correction of a pulse width, laser light L may be generated from the light source LS. The laser light L generated from the light source LS may be first laser light L1. The first laser light L1 may have a wavelength in a near-infrared region and a femtosecond pulse width. In other words, the light source LS may generate femtosecond pulse laser light. For example, the light source LS may include an about 75 femtosecond pulse Ti: sapphire laser device.

The first two-photon sensor TS1 may measure a first pulse width PW1 of the laser light L generated from light source LS. For example, the first laser light L1 may be delivered to the interference system IF, and the interference system IF may output second laser light L2 from the first laser light L1. The second laser light L2 may have the first pulse width PW1, and be delivered to the first two-photon sensor TS1. Te first two-photon sensor TS1 may measure the first pulse width PW1, and the measured first pulse width PW1 may be delivered to the data reception unit DR.

The interference system IF may further output third laser light L3. The third laser light L3 may have substantially the same pulse with as the second laser light L2. The third laser light L3 may be delivered to the pulse width correction device DC. The pulse width correction device DC may output fourth laser light L4 from the third laser light L3. The fourth laser light L4 may be initial fourth laser light L4a.

The optical system OS may receive the initial fourth laser light L4a output from the pulse width correction device DC. The optical system OS may output fifth laser light L5 from the initial fourth laser light L4a. The fifth laser light L5 may be initial fifth laser light L5a. The initial fifth laser light L5a may be the laser light L modulated while the fourth laser light L4a passes through the optical system, and may have a different pulse width from the initial fourth laser light L4a.

The fifth laser light L5 may have a second pulse width PW2. For example, the initial fifth laser light L5a may have an initial second pulse width PW2a. The initial second pulse width PW2a may be different from the first pulse width PW1. The initial second pulse width PW2a may have a difference of a positive dispersion value in comparison with the first pulse width PW1. For example, the positive dispersion value may be obtained by subtracting the first pulse width PW1 from the initial second pulse width PW2a.

The initial fifth laser light L5a may be output from the optical system OS to be delivered to the second two-photon sensor TS2. The second two-photon sensor TS2 may measure the initial second pulse width PW2a of the initial fifth laser light L5a, and the measured initial second pulse width PW2a may be delivered to the data reception unit DR.

The data reception unit DR may receive the first pulse width PW1 and the initial second pulse width PW2a. A pulse width difference (e.g., the positive dispersion value) between the first pulse width PW1 and the initial second pulse width PW2a may be calculated in the data reception unit DR.

Referring to FIGS. 1 and 3, the pulse widths may be corrected in the pulse width correction device DC.

Specifically, in order to correct the difference between the first pulse width PW1 and the initial second pulse width PW2a, the pulse width may be corrected in the pulse width correction device DC. By performing the correction, the pulse width correction device DC may output the fourth laser light L4 from the third laser light L3, and the fourth laser light L4 may be corrected fourth laser light L4b. The corrected fourth laser light L4b may be the laser light L obtained by modulating the pulse width of the third laser light L3 received from the interference system IF.

For example, the pulse width of the corrected fourth laser light L4b may have a difference of a negative dispersion value in comparison with the first pulse width PW1. The negative dispersion value may be a value corresponding to the difference between the first pulse width PW1 and the second pulse width PW2. For example, the negative dispersion value may be obtained by subtracting the initial second pulse width PW2a from the first pulse width PW1. The correction may include adding the negative dispersion value to the pulse width of the third laser light L3. In other words, the pulse width of the corrected fourth laser light L4b may be a result of adding the negative dispersion value to the pulse width of the third laser light L3. When the negative pulse width is added to the initial second pulse width PW2a, the difference of the positive dispersion value between the first pulse width PW1 and the initial second pulse width PW2a may be canceled out.

The optical system OS may receive the corrected fourth laser light L4b to output the fifth laser light L5. The fifth laser light L5 may be corrected fifth laser light L5b in which the difference of the positive dispersion value is cancelled out due to the negative dispersion value. The corrected fifth laser light L5b may have corrected second pulse width PW2b. The corrected fifth laser light L5b may have substantially the same pulse width as the second laser light L2. In other words, the first pulse width PW1 and the corrected second pulse width PW2b may be substantially same.

The optical system OS may further output sixth laser light L6. The sixth laser light L6 may have substantially the same pulse width as the corrected fifth laser light L5b. The sixth laser light L6 may be delivered to the sample part SP. A sample desired to be measured may be disposed on the sample part SP, and electrons in the sample may receive energy delivered from the sixth laser light L6 to be in an excited state. The electrons in the excited state change back to a lower energy band to emit detection light DL. The detection light DL may include first detection light DL1 and second detection light DL2. The first detection light DL1 may be the detection light DL emitted from the sample to be delivered to the optical system OS, and the second detection light DL2 may be the detection light DL emitted by the optical system OS that have received the first detection light DL1. The second detection light DL2 output from the optical system OS may be delivered to the detector PMT. Through the second detection light DL2 delivered to the detector PMT, the sample may be observed.

The comparison between the first pulse width PW1 and the second pulse width PW2 and the correction for the data may be performed repeatedly. In other words, the difference between the first pulse width PW1 and the corrected second pulse width PW2b is calculated and the correction for the difference may be repeatedly performed in the pulse width correction device DC.

Figure 4:
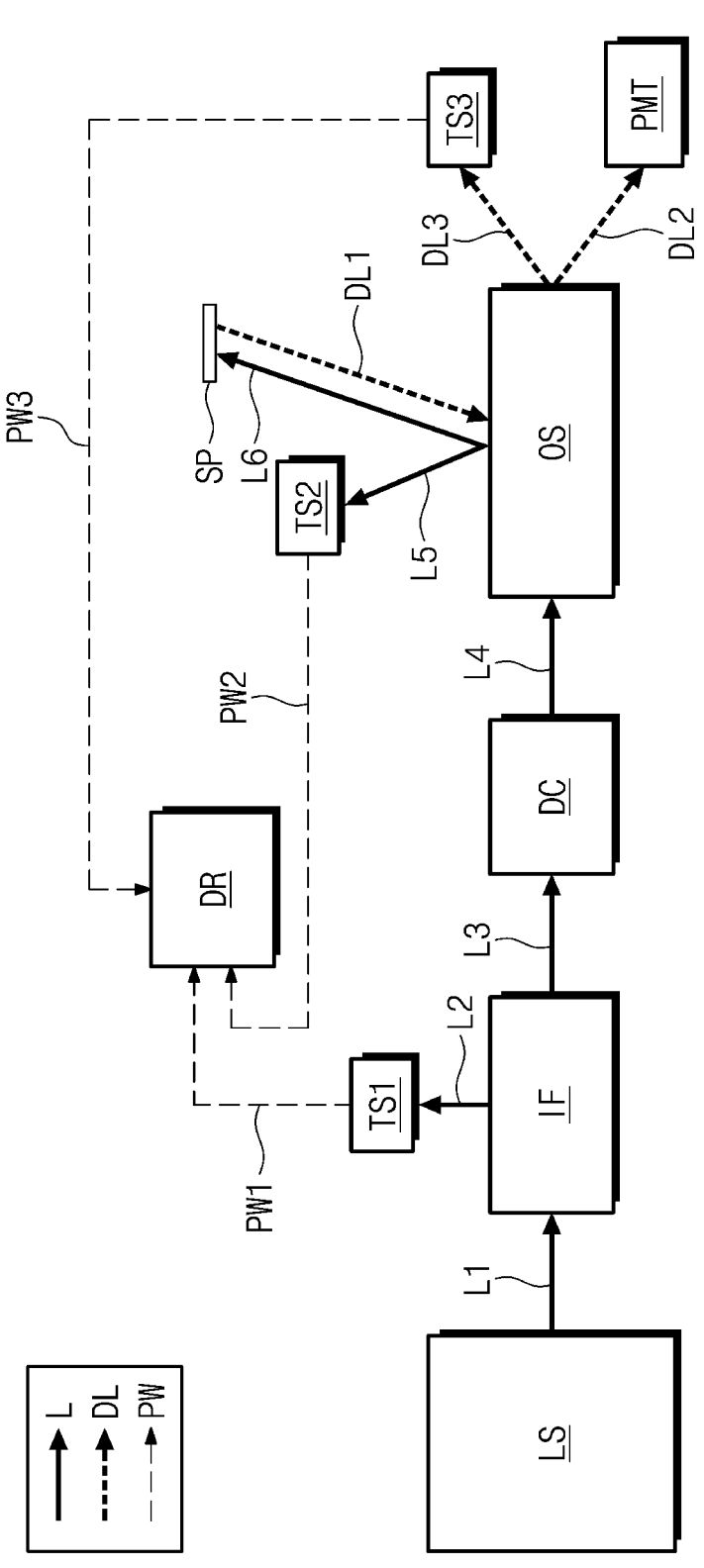
FIG. 4 illustrates a two-photon microscopy according to another embodiment of the inventive concept.

FIG. 4 illustrates a two-photon microscopy according to another embodiment of the inventive concept. For simplification of description, the aforementioned content and the repetitive descriptions will be omitted.

Referring to FIG. 4, the two-photon microscopy of the inventive concept may further include a third two-photon sensor TS3, and the detection light DL may further include third detection light DL3. The detection light DL may be emitted from the sample part SP to pass through the optical system OS, and then be delivered to the third two-photon sensor TS3. Specifically, the first detection light DL1 may be delivered from the sample part SP to the optical system OS, and the third detection light DL3 may be delivered from the optical system OS to the third two-photon sensor TS3. The third detection light DL3 may have a different pulse width from the second laser light L2 and the fifth laser light L5.

The third detection light DL3 may have the third pulse width PW3, and the third pulse width PW3 may have substantially the same pulse width as the second detection light Dl2. The third pulse width PW3 may be different from the first pulse width PW1 and the second pulse width PW2. The third two-photon sensor TS3 may receive the third detection light DL3, and measure the third pulse width PW3. The measured third pulse width PW3 may be delivered to the data reception unit DR.

The data reception unit DR may receive the first pulse width PW1 and the third pulse width PW3. The difference (e.g., the positive dispersion value) between the first pulse width PW1 and the third pulse width PW3 may be calculated in the data reception unit DR. Then, in order to correct the difference, the pulse width may be corrected in the pulse width correction device DC. A correction method may be substantially the same as the method for correcting the difference between the first pulse width PW1 and the second pulse width PW2, which is described with reference to FIGS. 1 to 3.

Figure 5:
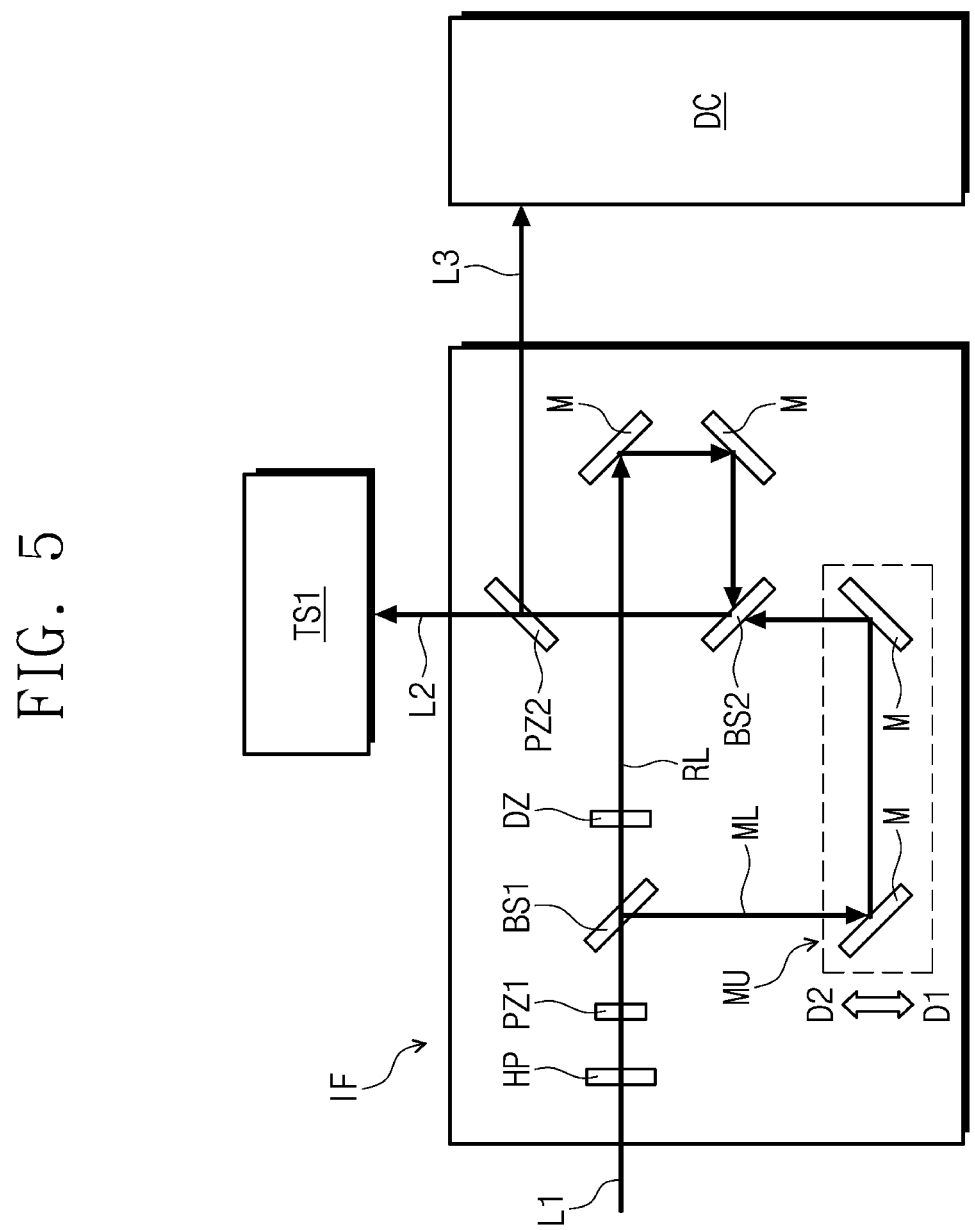
FIG. 5 illustrates an example of an interference system of FIG. 1.
Figure 6:
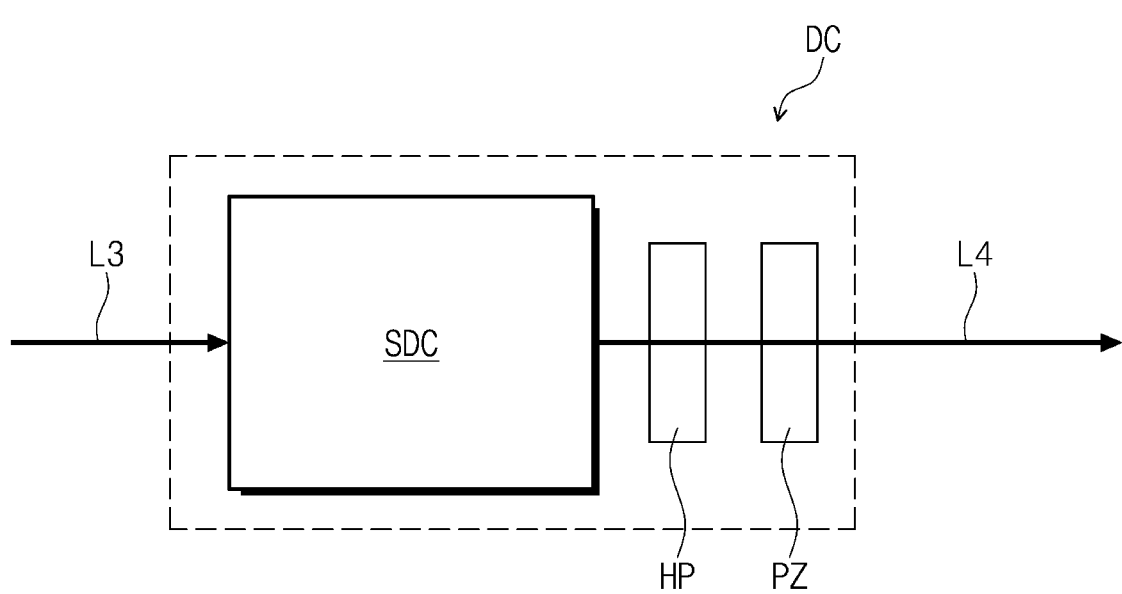
FIG. 6 illustrates an example of a pulse width correction device of FIG. 1.
Figure 7:
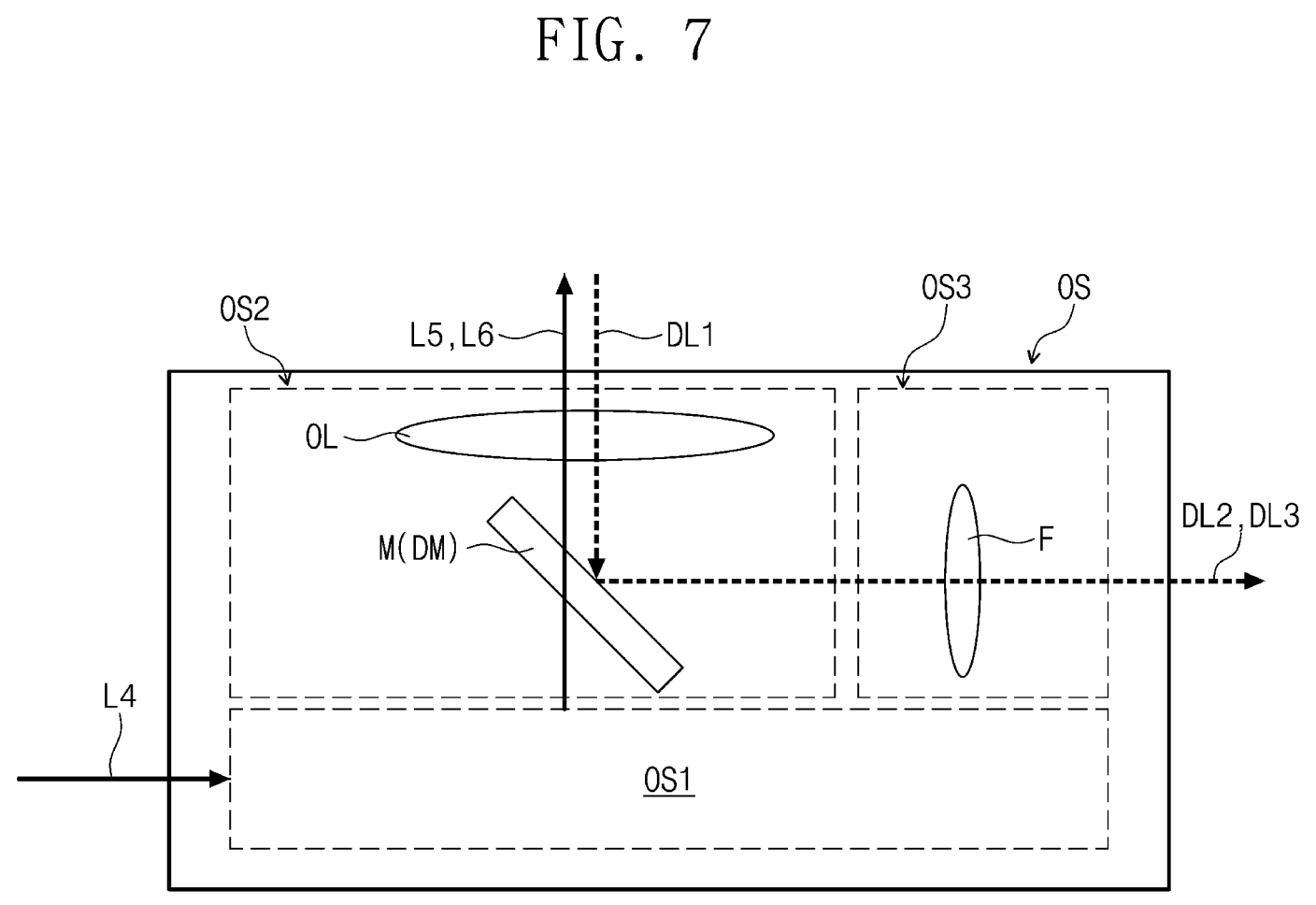

FIG. 5 illustrates an example of the interference system of FIG. 1. FIG. 6 illustrates an example of the pulse width correction device of FIG. 1. FIG. 7 illustrates an example of the optical system of FIG. 1. Hereinafter, with reference to FIGS. 5 to 7, the interference system, the pulse width correction device, and the optical system of FIG. 1 will be described in detail.

Referring to FIGS. 1 and 5, the interference system IF may include a half-wave plate HP, first and second polarizer PZ1 and PZ2, first and second spectroscopes BS1 and BS2, a corrector DZ, a mirror M, and a moving unit MU.

The first laser light L1 generated from the light source LS may move to the first spectroscope BS1 via the first half-wave plate HP and the first polarizer PZ1. The half-wave plate HP may rotate a polarization axis of the first laser light L1, and the first polarizer PZ1 may make the first laser light L1, of which polarization axis is rotated, polarized.

The first laser light L1 may be divided into reference light RL and moving light ML via the first spectroscope BS1. The reference light RL may be delivered to the second spectroscope via the corrector DZ. The corrector DZ may correct modulation of the pulse width of the reference light RL caused by the first spectroscope BS1. One or more mirrors M are disposed between the first spectroscope BS1 and the second spectroscope BS2, and disposed on a path along which the reference light RL moves.

The moving light ML may be delivered from the first spectroscope BS1 to the second spectroscope BS2 via the moving unit MU. The moving unit MU may include one or more mirrors M, and move in a direction D1 to move away from the first spectroscope BS1 or a direction D2 to move closer thereto. In other words, a propagation distance of the moving light ML from the first spectroscope BS1 to the second spectroscope BS2 may be adjusted by the moving unit MU. Through this, a phase difference may be generated in the second spectroscope BS2 between the reference light RL and the moving light ML. Due to the phase difference, the reference light RL and the moving light ML produce an interference phenomenon, and light generated through the interference phenomenon may be delivered to the second polarizer PZ2. The interference light may be divided into the second laser light L2 and the third laser light L3 via the second polarizer PZ2. The second laser light L2 and the third laser light L3 may have substantially the same pulse width.

Referring to FIGS. 1 and 6, the pulse width correction device DC may include a sub-pulse width correction device SDC. The third laser light L3 output from the interference system IF may be delivered to the sub-pulse width correction device SDC of the pulse width correction device DC. The sub-pulse width correction device SDC may perform the pulse width correction described with reference to FIGS. 1 to 3.

The pulse width correction device DC may further include a half-wave plate HP and a polarizer PZ. After the correction, the laser light L emitted from the sub-pulse width correction device SDC may pass through the half-wave plate HP and the polarizer PZ, and the pulse width correction device DC may output the fourth laser light L4.

For example, prior to the correction, the pulse widths of the third laser light L3 and the fourth laser light L4 may be substantially same. For another example, after the correction, the pulse widths of the third laser light L3 and the fourth laser light L4 may be different.

With reference to FIGS. 1 and 7, the optical system OS may include a first optical system OS1, a second optical system OS2, and a third optical system OS3.

The fourth laser light L4 may be delivered to the first optical system OS1. Although not shown in the drawings, the first optical system OS1 may include at least one of a mirror, a lens, or a scanner, or a set of them.

The second optical system OS2 may include a mirror M and an object lens OL. The mirror M may be a dichroic mirror DM. After passing through the first optical system OS1, the fourth laser light L4 may pass through the second optical system OS2 to be modulated to the fifth and sixth beams of laser light L5 and L6. Specifically, the laser light L emitted from the first optical system OS1 may sequentially pass through the mirror M and the object lens OL, and, in this process, may be modulated to the fifth and sixth beams of laser light L5 and L6. The pulse widths of the fifth laser light L5 and the sixth laser light L6 may be different.

The sixth laser light L6 may be delivered to the sample on the sample part SP, and the electrons in the sample may obtain the energy from the sixth laser light L6 to be in an excited state and then change to a lower energy band to emit the first detection light DL1. The first detection light DL1 may be delivered to the third optical system OS3 via the second optical system OS2. Specifically, the first detection light DL1 may pass through the object lens OL and then be reflected by the mirror M to be delivered to the third optical system OS3. The third optical system OS3 may include a filter F. The third optical system OS3 may receive the first detection light DL1 and emit the second and third beams of detection light DL2 and DL3. The pulse widths of the second detection light DL2 (or the third detection light DL3) and the first detection light DL1 may be different.

However, FIGS. 5 to 7 only illustrate example configurations of the pulse width correction device and the optical system, and the inventive concept is not limited thereto.

FIGS. 8 to 11 illustrate examples of the sub-pulse width correction device of FIG. 6.

Figure 8:
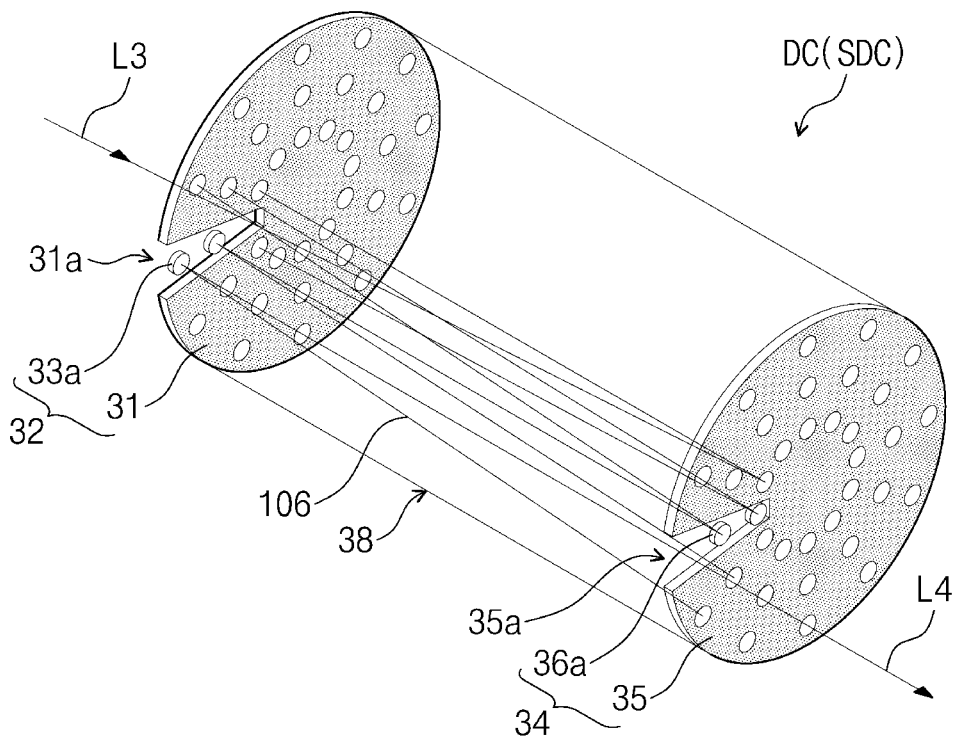
FIG. 8 to FIG. 11 illustrate examples of a sub-pulse width correction device of FIG. 6.

With reference to FIG. 8, the sub-pulse width correction device SDC may include a chirped reflection mirror. The chirped reflection mirror may include a first multi-reflection mirror 32, a second multi-reflection mirror 34, and a group delay dispersion block 38.

The first multi-reflection mirror 32 may include a first large area mirror 31 and a plurality of first small area mirrors 33*a* disposed in the first large area mirror 31. The first large area mirror 31 may include a first side hole 31*a*. The second multi-reflection mirror 34 may include a second large area mirror 35 and a plurality of second small area mirrors 36*a* disposed in the second large area mirror 35. The second large area mirror 35 may include a second side hole 35*a*. The group delay dispersion block 38 may be disposed between the first and second multi-reflection mirrors 32 and 34. According to an example, the group delay dispersion block 38 may include a dielectric cylinder.

The third laser light L3 incident to the chirped reflection mirror through the first side hole 31*a* may be reflected plural times through the first and second small area mirrors 33*a* and 36*a*. During the reflection process, the pulse width of the third laser light L3 may change in the group delay dispersion block 38. The third laser light L3 with a change in pulse width may become the fourth laser light L4, and the fourth laser light L4 may pass through the second side hole 35*a* to be emitted from the chirped reflection mirror.

Figure 9:
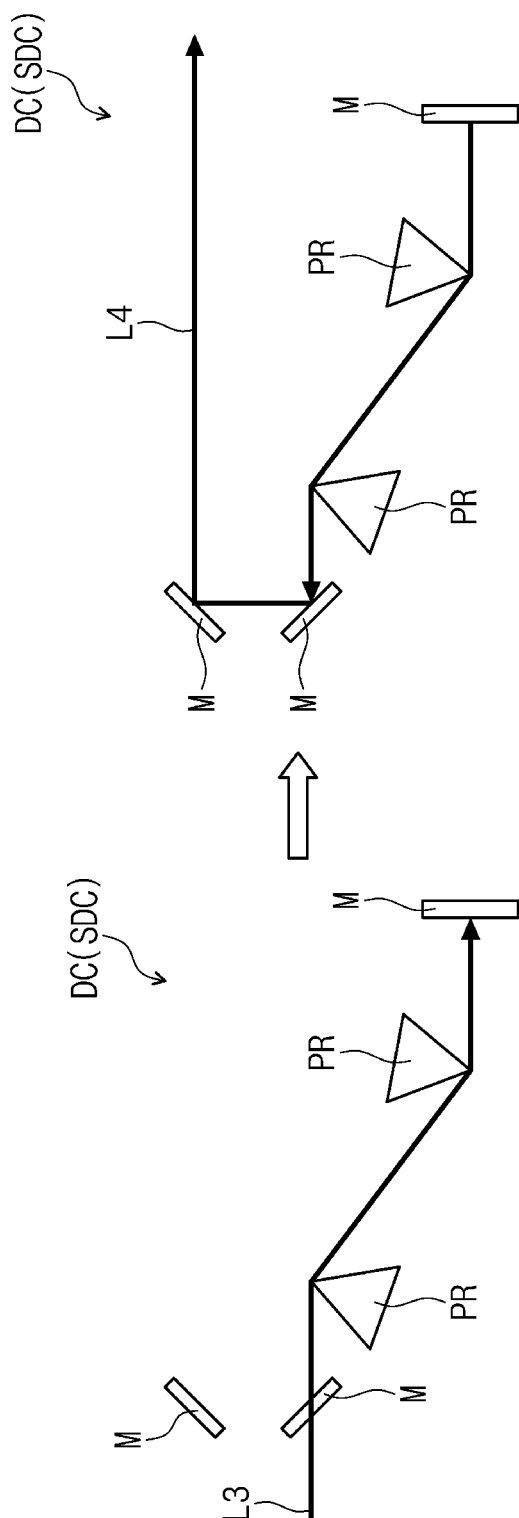

With reference to FIG. 9, the sub-pulse width correction device SDC may include a pair of prisms PR. The third laser light L3 may be incident to the sub-pulse width correction device SDC, and then pass through the pair of prisms PR to be reflected by the mirror M. The reflected third laser light L3 may pass through the pair of prisms again to be reflected by another mirror M, and then pass through the sub-pulse width correction device SDC. During the passing through the pair of prisms PR, the pulse width of the third laser light L3 may change, and the third laser light L3 with a change in pulse width may become the fourth laser light L4.

Figure 10:
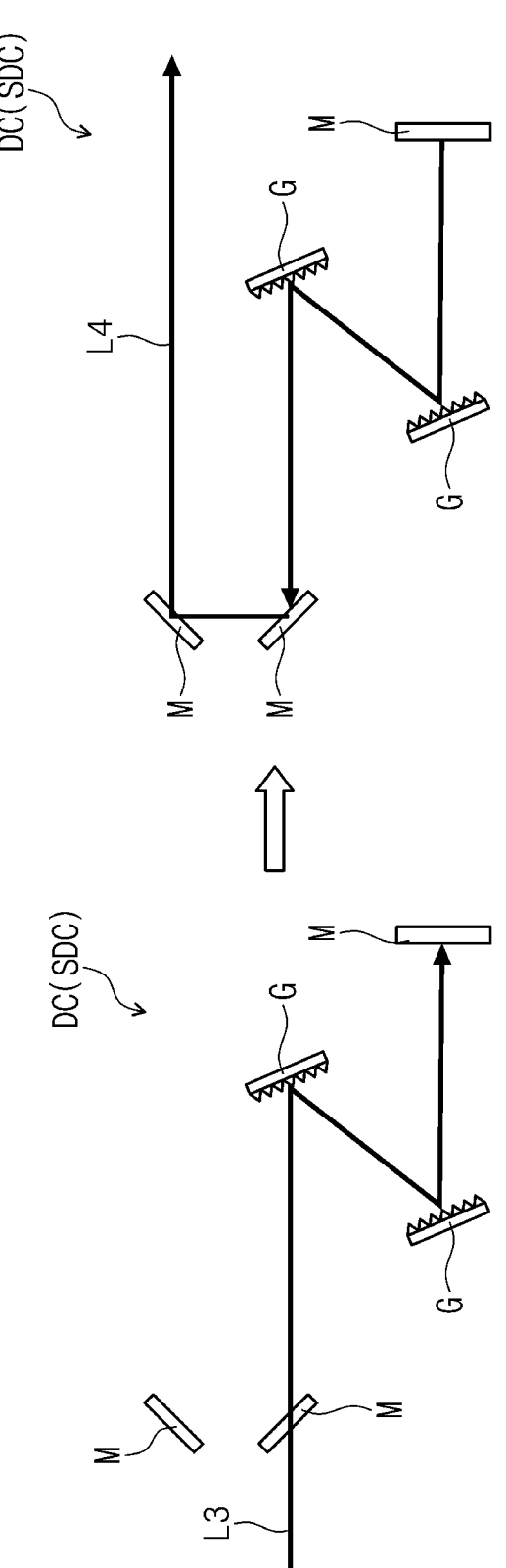

With reference to FIG. 10, the sub-pulse width correction device SDC may include a pair of diffraction gratings G. The third laser light L3 may be incident to the sub-pulse width correction device SDC, and then pass through the pair of diffraction gratings G to be reflected by the mirror M. The reflected third laser light L3 may pass through the pair of diffraction gratings G again to be reflected by another mirror M, and then pass through the sub-pulse width correction device SDC. During the passing through the pair of diffraction gratings G, the pulse width of the third laser light L3 may change, and the third laser light L3 with a change in pulse width may become the fourth laser light L4.

Figure 11:
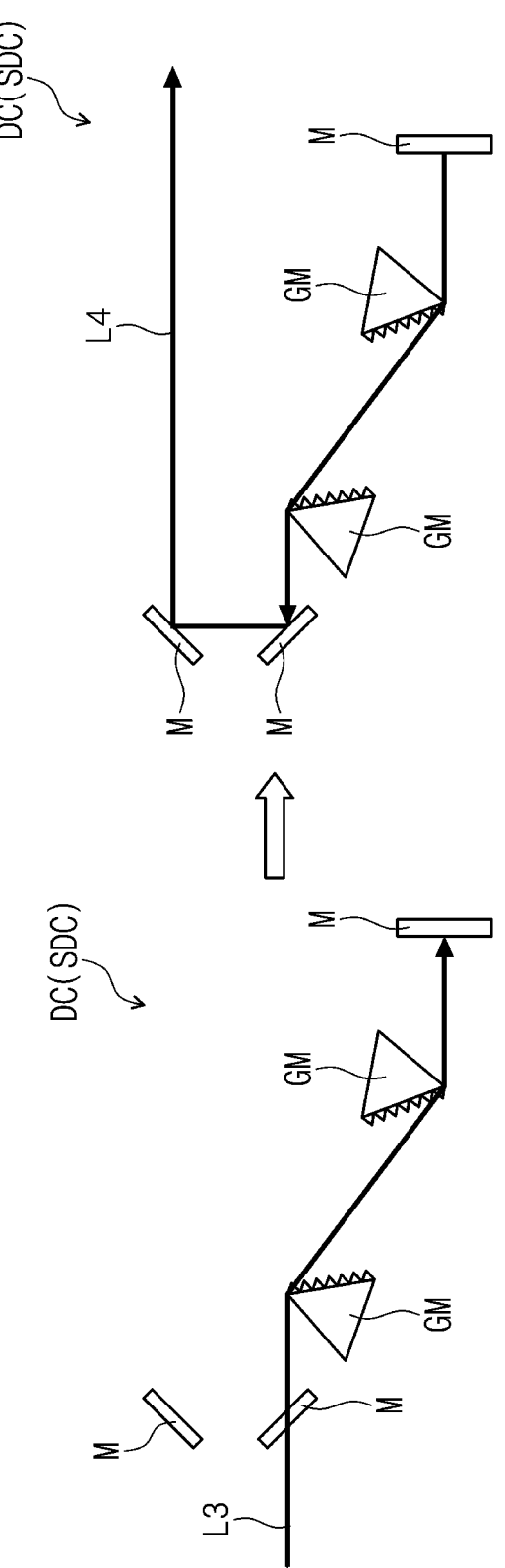

With reference to FIG. 11, the sub-pulse width correction device SDC may include a pair of grisms GM. The third laser light L3 may be incident to the sub-pulse width correction device SDC, and then pass through the pair of grisms GM to be reflected by the mirror M. The reflected third laser light L3 may pass through the pair of grisms GM again to be reflected by another mirror M, and then pass through the sub-pulse width correction device SDC. During the passing through the pair of grisms GM, the pulse width of the third laser light L3 may change, and the third laser light L3 with a change in pulse width may become the fourth laser light L4.

However, FIGS. 8 to 11 only illustrate example configurations of the sub-pulse width correction device, and the inventive concept is not limited thereto.

Typically, while the laser light L passes through the optical system OS in the two-photon microscopy to reach the sample, the pulse width of the laser light L may be modulated due to the mirror M, the lens or the scanner in the optical system OS. Such modulation of the pulse width may distort the detection value measured for the sample.

According to the inventive concept, the two-photon microscopy may include a first two-photon sensor TS1, a second two-photon sensor TS2, and a pulse width correction device DC. The first two-photon sensor TS1 may be disposed adjacent to the light source LS to measure a reference pulse width of the laser light L. The second two-photon sensor TS2 may be disposed adjacent to the sample part SP to measure the pulse width of the laser light L modulated by the optical system OS. Thereafter, the pulse widths measured by the first and second two-photon sensors TS1 and TS2 are compared, and the pulse width correction device DC may perform the correction to minimize the modulation of the pulse width. In addition, according to some embodiments, the pulse width of the detection light DL may be measured by the third two-photon sensor TS3 disposed adjacent to the detector PMT and additional correction may be performed thereon. As the result, the distortion of the laser light L due to the optical system OS may be minimized.

According to the inventive concept, a first two-photon sensor adjacent to a light source and configured to measure a pulse width of laser light, and a second two-photon sensor adjacent to a sample part and configured to measure a pulse width of the laser light may be provided. The pulse widths measured by the first and second two-photon sensors may be compared to calculate pulse width modulation values due to the optical system, and the modulation values may be corrected in a pulse width correction device. As a result, distortion of the laser light due to the optical system may be minimized.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A two-photon spectroscopy, comprising:
   a light source configured to generate first laser light having a pulse;
   a pulse width correction device configured to receive the first laser light to output a second laser light;
   an optical system through which the second laser light passes;
   a first two-photon sensor configured to measure a first pulse width of the first laser light generated from the light source;
   a data reception unit; and
   a second two-photon sensor configured to measure a second pulse width of the second laser light passing through the optical system,
   wherein the pulse width correction device is configured to decrease a difference between the first pulse width and the second pulse width,
   wherein the first two-photon sensor and the second two-photon sensor are connected to the data reception unit,
   wherein the first pulse width and the second pulse width are delivered to the data reception unit,
   wherein the data reception unit is configured to calculate the difference between the first pulse width and the second pulse width, and
   wherein the measuring of the first pulse width, the measuring of the second pulse width, and the decreasing of the difference between the first pulse width and the second pulse width is repeatedly performed by the pulse width correction device.

2. The two-photon spectroscopy of claim 1, wherein the first laser light generated by the light source has a wavelength of a near-infrared region.

3. The two-photon spectroscopy of claim 1, wherein the first laser light generated by the light source has a pulse width of femtoseconds.

4. The two-photon spectroscopy of claim 1, wherein the pulse width correction device includes a half-wave plate and a polarizer.

5. The two-photon spectroscopy of claim 1, wherein the pulse width correction device includes a chirped reflection mirror.

6. The two-photon spectroscopy of claim 1, wherein the pulse width correction device includes a pair of prisms.

7. The two-photon spectroscopy of claim 1, wherein the pulse width correction device includes a pair of diffraction gratings.

8. The two-photon spectroscopy of claim 1, wherein the pulse width correction device includes a pair of grisms.

9. The two-photon spectroscopy of claim 1, wherein the pulse width correction device is disposed between the light source and the optical system, and outputs the second laser light having the second pulse width obtained by adding a negative dispersion value to the first pulse width.

10. The two-photon spectroscopy of claim 1, further comprising:
   a sample part to which the second laser light is delivered from the optical system; and
   a third two-photon sensor configured to measure a third pulse width of detection light emitted from the sample part to pass through the optical system,
   wherein the pulse width correction device further decreases a difference between the first pulse width and the third pulse width.

11. The two-photon spectroscopy of claim 10,
   wherein the optical system includes a first optical system, a second optical system, and a third optical system,
   wherein the second laser light passes through the first optical system and the second optical system, and
   the detection light passes through the second optical system and the third optical system.

12. The two-photon spectroscopy of claim 1, further including:
   an interference system between the light source and the first two-photon sensor to deliver a portion of the first laser light generated by the light source to the first two-photon sensor.

13. A two-photon spectroscopy, comprising:
   a light source configured to generate first laser light having a pulse;
   an interference system configured to receive the first laser light to output second and third beams of laser light;
   a first two-photon sensor configured to measure a first pulse width of the second laser light;
   a pulse width correction device configured to receive the third laser light to output a fourth laser light;
   an optical system configured to receive the fourth laser light to output fifth laser light;
   a data reception unit; and
   a second two-photon sensor configured to measure a second pulse width of the fifth laser light,
   wherein the pulse width correction device decreases a difference between the first pulse width and the second pulse width,
   wherein the first two-photon sensor and the second two-photon sensor are connected to the data reception unit,
   wherein the first pulse width and the second pulse width are delivered to the data reception unit,
   wherein the data reception unit is configured to calculate the difference between the first pulse width and the second pulse width, and
   wherein the measuring of the first pulse width, the measuring of the second pulse width, and the decreasing of the difference between the first pulse width and the second pulse width is repeatedly performed by the pulse width correction device.

14. The two-photon spectroscopy of claim 13, wherein the pulse width correction device outputs corrected fourth laser light having a second pulse width obtained by adding a negative dispersion value to a pulse width of the third laser light.

15. The two-photon spectroscopy of claim 13, further including:
   a sample part to which sixth laser light emitted from the optical system is delivered; and
   a third two-photon sensor configured to measure a third pulse width of detection light emitted from the sample part to pass through the optical system,
   wherein the pulse width correction device further corrects a difference between the first pulse width and the third pulse width.

16. The two-photon spectroscopy of claim 15,
   wherein the optical system includes a first optical system, a second optical system, and a third optical system,
   wherein the fourth laser light passes through the first optical system and the second optical system, and
   the detection light passes through the second optical system and the third optical system.

17. A pulse width correction method, comprising:
   measuring, by a first two-photon sensor, a first pulse width of a first laser light output from a light source;
   measuring, by a second two-photon sensor, a second pulse width of a second laser light output from optical system when the first laser light passes through the optical system;
   calculating, by a data reception unit, a difference between the first pulse width and the second pulse width; and
   decreasing, by a pulse width correction device, the difference between the first pulse width and the second pulse width based on a negative dispersion value corresponding to the difference between the first pulse width and the second pulse width,
   wherein the first two-photon sensor and the second two-photon sensor are connected to the data reception unit,
   wherein the first pulse width and the second pulse width are delivered to the data reception unit, and
   wherein the measuring of the first pulse width, the measuring of the second pulse width, and the decreasing of the difference between the first pulse width and the second pulse width is repeatedly performed by the pulse width correction device.

18. The pulse width correction method of claim 17, wherein the calculating and decreasing are repeatedly performed.

19. The pulse width correction method of claim 17, wherein the second pulse width, prior to the decreasing of the difference between the first pulse width and the second pulse width, has a difference corresponding to a positive dispersion value in comparison to the first pulse width.

20. The pulse width correction method of claim 17, further comprising:
   delivering the second laser light from the optical system to a sample part;
   measuring a third pulse width of detection light emitted from the sample part to pass through the optical system;
   calculating a difference between the first pulse width and the third pulse width; and decreasing the difference between the first pulse width and the third pulse width.

* * * * *